United States Patent
Choi

(10) Patent No.: US 6,954,153 B2
(45) Date of Patent: Oct. 11, 2005

(54) SYSTEM AND METHOD FOR COMMUNICATING MAP DATA FOR VEHICLE NAVIGATION

(75) Inventor: Jang Don Choi, Tokyo (JP)

(73) Assignee: Hyundai Motor Company, Seoul (KR)

( * ) Notice: Subject to any disclaimer, the term of this patent is extended or adjusted under 35 U.S.C. 154(b) by 80 days.

(21) Appl. No.: 10/665,587

(22) Filed: Sep. 19, 2003

(65) Prior Publication Data

US 2004/0207541 A1 Oct. 21, 2004

(30) Foreign Application Priority Data

Apr. 21, 2003 (KR) ................... 10-2003-0025106

(51) Int. Cl.[7] .............................................. G08G 1/123
(52) U.S. Cl. ..................... 340/995.12; 340/995.14; 340/995.15; 340/995.17; 701/208
(58) Field of Search ................ 340/995.11, 995.15, 340/995.12, 995.18; 701/208

(56) References Cited

U.S. PATENT DOCUMENTS

| | | | | |
|---|---|---|---|---|
| 4,660,037 A | * | 4/1987 | Nakamura | 340/990 |
| 4,845,631 A | * | 7/1989 | Bottorf | 345/554 |
| 5,541,592 A | * | 7/1996 | Shiihara | 340/990 |
| 5,699,255 A | * | 12/1997 | Ellis et al. | 701/212 |
| 6,320,518 B2 | * | 11/2001 | Saeki et al. | 340/995.12 |
| 6,532,417 B2 | * | 3/2003 | Hatano | 701/207 |
| 6,675,092 B1 | * | 1/2004 | Katayama et al. | 701/208 |
| 6,694,253 B2 | * | 2/2004 | Schroeder | 701/208 |
| 2004/0128068 A1 | * | 7/2004 | Chun | 701/208 |

FOREIGN PATENT DOCUMENTS

JP  2003-065788  5/2003

* cited by examiner

Primary Examiner—Daniel Wu
Assistant Examiner—Travis Hunnings
(74) Attorney, Agent, or Firm—Morgan Lewis & Bockius LLP

(57) ABSTRACT

A map data transmitting server is interconnected with a vehicle terminal through a wireless network. The vehicle terminal determines a range of cells of which cell data are required for navigation based on vehicle state information, and requests the map data transmitting server to transmit the cell data of the cells thereto.

13 Claims, 4 Drawing Sheets

SYSTEM AND METHOD FOR COMMUNICATING MAP DATA FOR VEHICLE NAVIGATION

CROSS-REFERENCE TO RELATED APPLICATIONS

This application claims priority of Korean Application No. 2003-0025106, filed on Apr. 21, 2003, the disclosure of which is incorporated fully herein by reference.

FIELD OF THE INVENTION

The present invention relates to a method and apparatus for communicating map data for vehicle navigation, and more particularly, to a method and apparatus for a navigation system of a vehicle to communicate map data with a map data transmitting server.

BACKGROUND OF THE INVENTION

Navigation systems for displaying a current vehicle position on a map have been widely adopted in vehicles. These navigation systems require map data. The map data for navigation systems are usually recorded in a data storage unit, for example, a CD-ROM or DVD, included in the navigation system. Regional map data are retrieved from the data storage unit as needed.

Recently, a separate server for providing map data through a wireless network has been used, such that the navigation system can receive regional map data from the server. The regional map data stored in the memory typically has the form of a grid, that is, the regional map is divided into a plurality of square cells. Map data in each cell is called "cell data" hereinafter.

Typically, the regional map data comprising a plurality of data cells which are selected around the current position of the vehicle is transmitted to the navigation system in the vehicle. Accordingly, in the case where the network load increases or the network speed decreases, renewal of the regional map data is delayed. Therefore, it is preferable that the amount of data required to be transmitted is reduced to a minimum.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a method and apparatus for communicating map data for vehicle navigation in which efficiency of map data communication is improved.

In a preferred embodiment, a system for communicating map data for vehicle navigation comprises a vehicle terminal and a map data transmitting server that is interconnected with the vehicle terminal through a wireless network. The vehicle terminal determines a range of cells of which cell data are required for navigation based on vehicle state information, and requests the map data transmitting server to transmit the cell data of the cells thereto.

Preferably, one constituent of the vehicle state information can be vehicle speed, and the vehicle terminal reduces the range of cells of which cell data are required when the vehicle speed increases, and expands the range of cells of which cell data are required when the vehicle speed decreases.

Preferably, one constituent of the vehicle state information can be a proceeding direction of the vehicle, and the vehicle terminal determines the range of cells of which cell data are required according to the proceeding direction of the vehicle.

Preferably, one constituent of the vehicle state information can be a scroll speed of the vehicle terminal, and the vehicle terminal reduces the range of cells of which cell data are required with an increase of the scroll speed of the vehicle terminal, and expands the range of cells of which cell data are required with a decrease of the scroll speed of the vehicle terminal.

Preferably, one constituent of the vehicle state information can be a scroll direction of the vehicle terminal, and the vehicle terminal determines the range of cells of which cell data are required according to the scroll direction of the vehicle terminal.

Preferably, one constituent of the vehicle state information can be a road classification. Accordingly, for example, in the case that the classification of the road on which the vehicle is positioned is determined to be a highway or an exclusive right-of-way for vehicles, the vehicle terminal determines the range of cells of which cell data are required based on a divergent point or an interchange on the road.

Preferably, one constituent of the vehicle state information can be the transmitting speed of the wireless network. Accordingly, the vehicle terminal reduces the range of cells of which cell data are required with a decrease of the transmitting speed of the wireless network, and expands the range of cells of which cell data are required with an increase of the transmitting speed of the wireless network.

In another preferred embodiment, a method for communicating map data for vehicle navigation that is particularly useful with the preferred embodiments of the system according to the invention is provided. The vehicle terminal determines the range of cells of which cell data are required, and requests the map data transmitting server to transmit the cell data thereto. The map data transmitting server accordingly retrieves the requested cell data and transmits the same to the vehicle terminal. Accordingly the vehicle terminal receives the cell data transmitted from the server correspondingly to the request.

In another preferred embodiment, a vehicle terminal for navigation is provided, which is interconnected with a map data transmitting server that stores map data for vehicle navigation comprising a plurality of cell data, and transmits the same through a wireless network.

A vehicle terminal according to one embodiment comprises: a network interface for communicating with the map data server; a receiver for gathering the vehicle state information; and a processing unit determining the range of cells of which cell data are required based on the vehicle state information, and requesting the map data transmitting server to transmit the cell data to the vehicle terminal.

Preferably, the vehicle state information can be whether the vehicle is proceeding or not, vehicle speed, proceeding direction, scroll speed and scroll direction of the vehicle terminal, classification of road, and wireless network transmission speed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
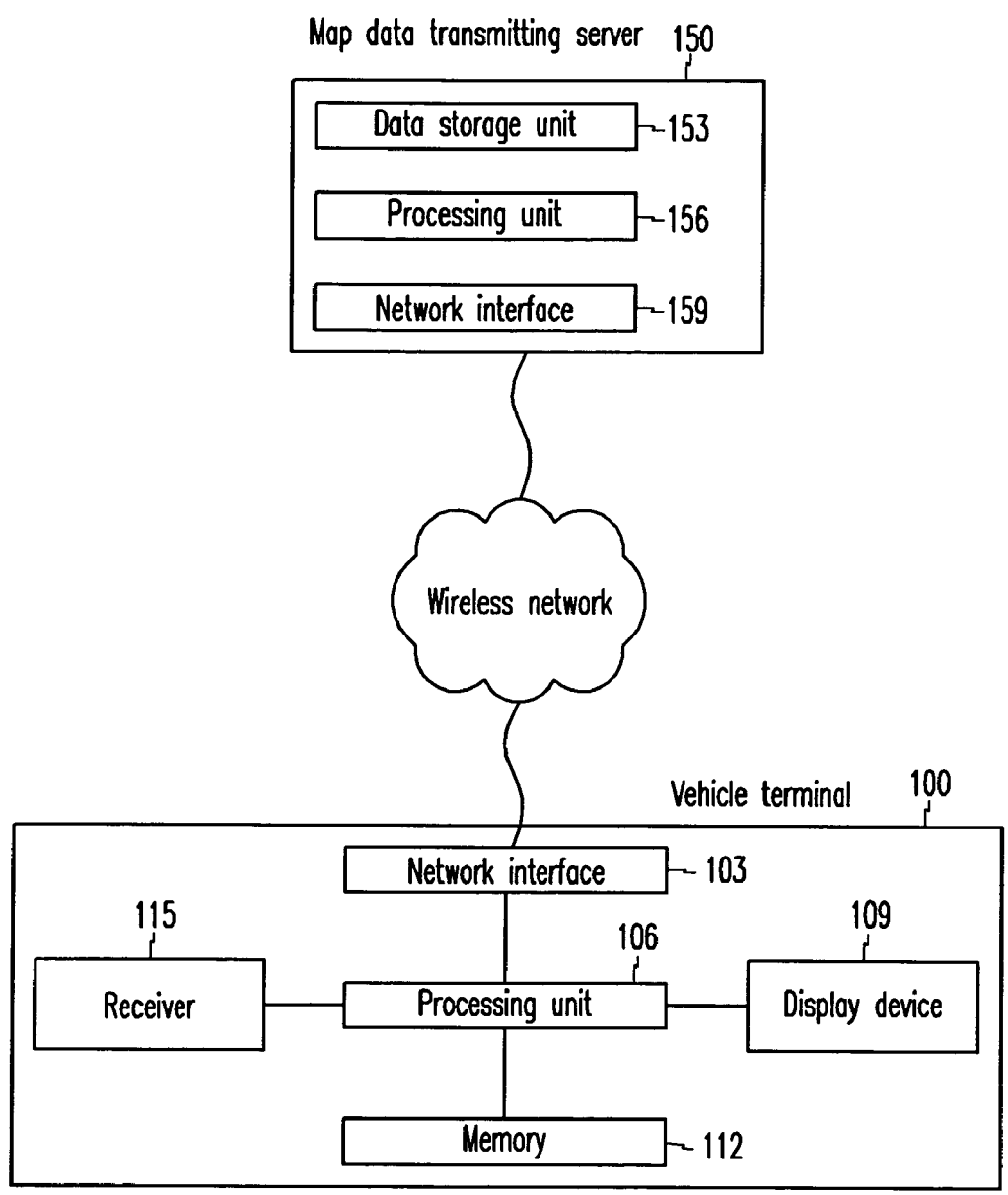
FIG. 1 is a block diagram of a system for communicating map data for vehicle navigation according to a preferred embodiment of the present invention.

As shown in FIG. 1, a system for communicating map data for vehicle navigation according to a preferred embodiment of the present invention comprises a vehicle terminal 100 mounted on the vehicle, and a map data transmitting server 150 connected to the vehicle terminal 100 through a wireless network.

The wireless network may be realized according to any kind of wireless communication network scheme, such as wireless Internet.

The vehicle terminal 100 mounted on the vehicle comprises a network interface 103, a receiver 115 for gathering vehicle state information, a processing unit 106 for determining the range of cells of which cell data are required based on vehicle state information and processing map data received through the network interface 103, a memory 112 for storing the received map data, and a display device 109 for displaying the received map data.

The vehicle state information gathered by the receiver 115 includes one or more of whether the vehicle is proceeding or not, vehicle speed, proceeding direction, scroll speed of the terminal, scroll direction of the terminal, classification of the road, and wireless network transmission speed.

The processing unit 106 can be realized by one or more processors activated by predetermined software, and the predetermined software can be programmed to perform each step of a method for communicating map data that must be executed in the vehicle terminal 100, according to a preferred embodiment of this invention.

The map data transmitting server 150 comprises a data storage unit 153 for storing map data for vehicle navigation, which is divided into a plurality of data cells, a processing unit 156 for extracting cell data from the data storage unit 153 and for transmitting the extracted cell data through the wireless network when requested from the vehicle terminal 100, and a network interface 159 for transmitting data through the wireless network.

The map data stored in the data storage unit 153 is divided into a plurality of data cells such that the entire map is divided according to a check pattern. Preferably, the data cells are indexed so that the each data cell can be defined by a consecutive number.

Figure 2:
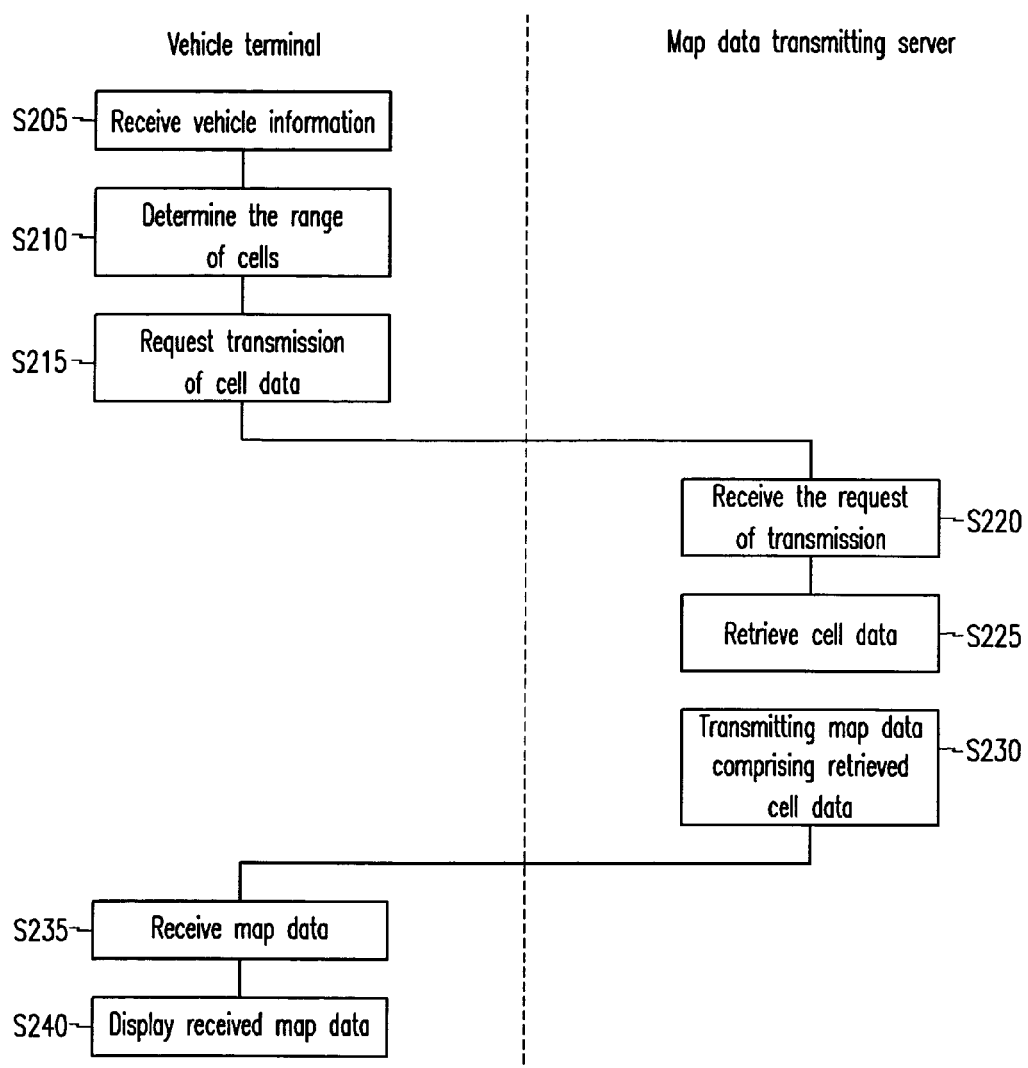
FIG. 2 is a flowchart for showing a method for communicating map data according to a preferred embodiment of the present invention.

FIG. 2 illustrates the method for communicating map data for vehicle navigation according to a preferred embodiment of this invention. The receiver 115 provided to the vehicle terminal 100 gathers vehicle state information from a plurality of sensors mounted on the vehicle, and GPS satellites, at step S205. The vehicle terminal 100 determines the range of cells of which cell data are required based on the vehicle state information at step S210. The vehicle terminal 100 transmits a request signal for cell data to the map data transmitting server 150 through the wireless network at step S215.

The map data transmitting server 150 receives the request signal for cell data at step S220, and extracts cell data from the data storage unit 153 at step S225 and transmits the extracted cell data through the wireless network at step S230. The vehicle terminal 100 receives the extracted cell data at step S235, and the received cell data are displayed by the display device 109 of the vehicle terminal 100 at step S240.

Hereinafter, regarding the preferable criteria for determining required cells, the range of cells of which cell data are required is described in detail.

Figure 3A:
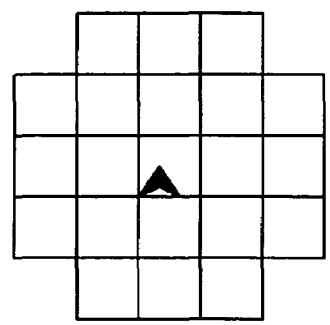
FIG. 3A illustrates the range of data cells transmitted when a vehicle is not proceeding.
Figure 3B:
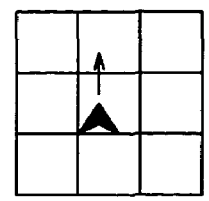
FIG. 3B illustrates the range of data cells transmitted when a vehicle is proceeding.

FIG. 3A and FIG. 3B respectively show the range of cells of which cell data are required when the vehicle is not proceeding and proceeding. When the vehicle is not proceeding, the range of cells of which cell data are required does not change. However, when the vehicle is proceeding, the range of cells of which cell data are required changes. Accordingly, when the vehicle is proceeding, it is preferable that the vehicle terminal 100 reduces the range of cells that are required so that the data traffic load can be decreased and the cell data displayed on the display device 109 can be renewed rapidly.

For example, as shown in FIG. 3A, when the vehicle is not proceeding, the vehicle terminal 100 requests cell data of twenty-one cells around the current vehicle position. However, as shown in FIG. 3B, when the vehicle is proceeding, the vehicle terminal 100 requests cell data of nine cells around the current vehicle position.

Preferably, whether the vehicle is proceeding or not can be determined by the vehicle speed.

Figure 4A:
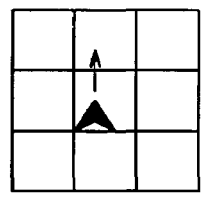
FIG. 4A illustrates the range of data cells transmitted when a scroll speed of a vehicle terminal or a vehicle speed is low.
Figure 4B:
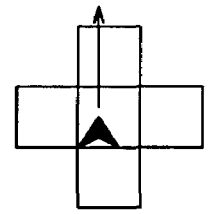
FIG. 4B illustrates the range of data cells transmitted when a scroll speed of a vehicle terminal or a vehicle speed is high.

FIG. 4A and FIG. 4B respectively show the range of cells of which cell data are required when the vehicle speed or the scroll speed of the vehicle terminal is low and high. As the vehicle speed or the scroll speed increases, the range of cells of which cell data are required changes more rapidly so that renewal of the cell data must be performed more rapidly, in proportion to the vehicle speed or the scroll speed. Accordingly, it is preferable that the range of cells of which cell data are required is reduced as the vehicle speed or the scroll speed of the vehicle terminal increases.

For example, as shown in FIG. 4A, when the vehicle speed or the scroll speed of the vehicle terminal is a predetermined low speed, the vehicle terminal 100 requests cell data of nine cells around the current vehicle position. However, as shown in FIG. 4B, when the vehicle speed or the scroll speed of the vehicle terminal is a predetermined high speed, the vehicle terminal 100 requests cell data of six cells around the current vehicle position.

Figure 5:
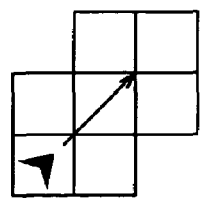
FIG. 5 illustrates the range of data cells according to a proceeding direction of the vehicle or a scroll direction of the terminal.

FIG. 5 shows the range of cells of which cell data are required when considering the proceeding direction of the vehicle. The vehicle terminal 100 firstly receives a current position of a vehicle from the GPS receiver (not shown), and subsequently determines a current position cell of the vehicle including the current position from cells stored in the memory. The vehicle terminal 100 then calculates a proceeding direction of the vehicle on the map data based on consecutive vehicle positions. Subsequently, the vehicle terminal 100 determines cells of which cell data are required based on the calculated proceeding direction of the vehicle.

For example, as shown in FIG. 5, the calculated proceeding direction of the vehicle is indicated as an arrow. When the current position cell and the proceeding direction of the vehicle are determined, the vehicle terminal 100 preferentially transmits signals for requesting cell data of cells that are positioned in the proceeding direction of the vehicle.

Figure 6:
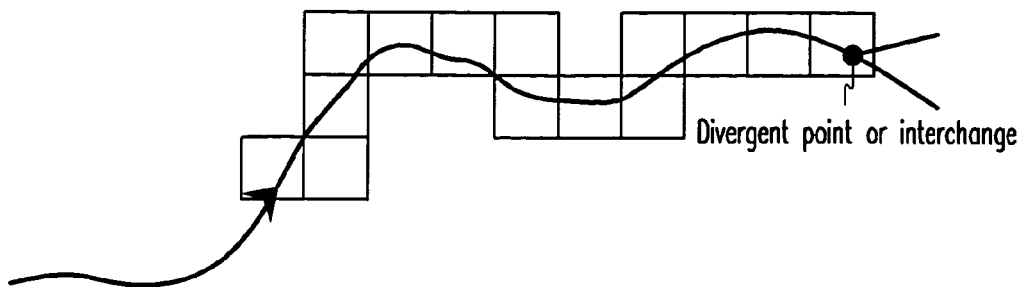
FIG. 6 illustrates the range of data cells according to a road classification.

FIG. 6 shows the range of cells of which cell data are required when considering the classification of the road on which the vehicle is positioned. Preferably, the cell data includes information regarding the classification of the road. Once the vehicle enters a highway or an exclusive right-of-way for vehicles, the vehicle is expected to proceed along the predetermined path. Accordingly, the vehicle terminal 100 does not need to receive cell data of the cells around the current positioned cell except for the cells on the path.

In addition, in the case that the vehicle is proceeding on the highway or exclusive right-of-way for vehicles, the vehicle speed is higher than usual so the cell data must be renewed rapidly.

For example, as shown in FIG. 6, if it is detected that the vehicle enters a highway or an exclusive right-of-way for vehicles, the vehicle terminal 100 preferentially transmits signals for requesting cell data of the cells that are positioned on the path up to an interchange or divergent point.

As shown above, according to a preferred embodiment of the present invention, the amount of cell data that must be transmitted can be reduced. This also reduces traffic load of a wireless network so that renewal of the cell data can be performed rapidly. Furthermore, data processing efficiency of map data and accordingly response speed of a navigation system is increased because time for data communication is substantially reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system for communicating map data for vehicle navigation, comprising:
    a vehicle terminal; and
    a map data transmitting server that is interconnected with the vehicle terminal through a wireless network,
    wherein the vehicle terminal determines the range of cells of which cell data are required for navigation based on vehicle state information, and requests the map data transmitting server to transmit the cell data of the cells thereto, wherein the vehicle state information includes a vehicle speed, and the vehicle terminal determines the range of cells of which cell data are required in inverse proportion to the vehicle speed.

2. The system of claim 1, wherein the vehicle state information further includes a proceeding direction of the vehicle, and the vehicle terminal determines the range of cells of which cell data are required according to the proceeding direction of the vehicle.

3. The system of claim 1, wherein the vehicle state information further includes a scroll direction of the vehicle terminal, and the vehicle terminal determines the range of cells of which cell data are required according to the scroll direction of the vehicle terminal.

4. The system of claim 1, wherein the vehicle state information further includes a transmitting speed of a wireless network, and the vehicle terminal determines the range of cells of which cell data are required in proportion to the transmitting speed of the wireless network.

5. A system for communicating map data for vehicle navigation, comprising:
    a vehicle terminal; and
    a map data transmitting server that is interconnected with the vehicle terminal through a wireless network,
    wherein the vehicle terminal determines the range of cells of which cell data are required for navigation based on vehicle state information, and requests the map data transmitting server to transmit the cell data of the cells thereto, wherein the vehicle state information includes a scroll speed of the vehicle terminal, and the vehicle terminal determines the range of cells of which cell data are required in inverse proportion to the scroll speed of the vehicle terminal.

6. A system for communicating map data for vehicle navigation, comprising:
    a vehicle terminal; and
    a map data transmitting server that is interconnected with the vehicle terminal through a wireless network,
    wherein the vehicle terminal determines the range of cells of which cell data are required for navigation based on vehicle state information, and requests the map data transmitting server to transmit the cell data of the cells thereto, wherein the vehicle state information includes a road classification, and in the case that the classification of the road on which the vehicle is positioned is determined to be a highway or an exclusive right-of-way for vehicles, the vehicle terminal determines the range of cells of which cell data are required based on a divergent point or an interchange on the road.

7. A method for communicating map data for vehicle navigation utilizing a server for transmitting map data through a wireless network to a vehicle terminal, said map data being divided into a plurality of data cells, the method comprising:
    gathering vehicle state information;
    determining a range of cells of which cell data are required based on the vehicle state information;
    requesting a map data transmitting server to transmit the cell data to the vehicle terminal; and
    receiving the cell data transmitted from the server correspondingly to the request, wherein the vehicle state information includes a vehicle speed, and the range of cells of which cell data are required is determined in inverse proportion to the vehicle speed.

8. The method of claim 7, wherein the vehicle state information further includes a proceeding direction of the vehicle, and the range of cells of which cell data are required is determined according to the proceeding direction of the vehicle.

9. The method of claim 7, wherein the vehicle state information further includes a scroll direction of the vehicle terminal, and the range of cells of which cell data are required is determined according to the scroll direction of the vehicle terminal.

10. The method of claim 7, wherein the vehicle state information further includes a transmitting speed of the wireless network, and the range of cells of which cell data are required is determined in proportion to the transmitting speed of the wireless network.

11. A method for communicating map data for vehicle navigation utilizing a server for transmitting map data through a wireless network to a vehicle terminal, said map data being divided into a plurality of data cells, the method comprising:

gathering vehicle state information;

determining a range of cells of which cell data are required based on the vehicle state information;

requesting a map data transmitting server to transmit the cell data to the vehicle terminal; and receiving the cell data transmitted from the server correspondingly to the request, wherein the vehicle state information includes a scroll speed of the vehicle terminal, and the range of cells of which cell data are required is determined in inverse proportion to the scroll speed of the vehicle terminal.

12. A method for communicating map data for vehicle navigation utilizing a server for transmitting map data through a wireless network to a vehicle terminal, said map data being divided into a plurality of data cells, the method comprising:

gathering vehicle state information;

determining a range of cells of which cell data are required based on the vehicle state information;

requesting a map data transmitting server to transmit the cell data to the vehicle terminal; and receiving the cell data transmitted from the server corresponding to the request, wherein the vehicle state information includes a road classification, and if the classification of the road on which the vehicle is positioned is determined to be a highway or an exclusive right-of-way for vehicles, the range of cells of which cell data are required is determined based on a divergent point or interchange on the road.

13. A vehicle terminal connected to a server for transmitting map data divided into a plurality of data cells through a wireless network, comprising:

a network interface for communicating with the map data transmitting server;

a receiver for gathering vehicle state information, wherein the vehicle state information includes at least one of a vehicle speed, a scroll speed of the vehicle terminal, and a road classification;

a network interface for transmitting data through the wireless network; and a processing unit determining a range of cells of which cell data are required based on the vehicle state information, and processing map data received through the network interface;

a memory for storing the received map data;

a display device for displaying the received map data; and wherein said vehicle terminal determines the range of cells of which cell data are required in inverse proportion to the vehicle speed when the vehicle state information includes the vehicle speed, said vehicle terminal determines the range of cells of which cell data are required in inverse proportion to the scroll speed of the vehicle terminal when the vehicle state information includes the scroll speed of the vehicle terminal, and said vehicle terminal determines the range of cells of which cell data are required based on a divergent point or an interchange on the road, in the case that the classification of the road on which the vehicle is positioned is determined to be a highway or an exclusive right-of-way for vehicles when the vehicle state information includes the road classification.

* * * * *